United States Patent [19]

Ikin et al.

[11] 4,333,525

[45] Jun. 8, 1982

[54] HEAT EXCHANGER FOR USE WITH HEAT PIPE

[75] Inventors: David D. Ikin, Blackburn; Paul G. Butler, Rosanna East; Christopher D. Sassella, Lower Plenty; James K. Oliver, Altona North, all of Australia

[73] Assignee: Alcoa of Australia Limited, Melbourne, Australia

[21] Appl. No.: 81,903

[22] Filed: Oct. 4, 1979

[30] Foreign Application Priority Data

Oct. 4, 1978 [AU] Australia .............................. PD6226
Feb. 19, 1979 [AU] Australia .............................. PD7737

[51] Int. Cl.³ .......................... F28D 15/00; F28D 7/10
[52] U.S. Cl. .............................. 165/104.21; 165/156; 126/433; 126/436
[58] Field of Search ................... 165/105, 156, 104.21; 126/433, 435

[56] References Cited

U.S. PATENT DOCUMENTS 2,060,936 11/1936 Haag, Jr. .............................. 165/156
2,091,119 8/1937 Saint-Jacques .................. 165/156 X
2,742,269 4/1956 Schefels et al. ................. 165/156 X
4,127,105 11/1978 Watt ..................................... 126/433

FOREIGN PATENT DOCUMENTS 290271 2/1916 Fed. Rep. of Germany ...... 165/156
1031365 3/1953 France ................................ 165/156
292296 6/1928 United Kingdom .
1461920 1/1977 United Kingdom .
1497538 1/1978 United Kingdom .
629434 10/1978 U.S.S.R. ............................ 165/105

Primary Examiner—Albert W. Davis
Attorney, Agent, or Firm—Diller, Ramik & Wight

[57] ABSTRACT

A heat exchanger jacket having a substantially tubular body portion is adapted to surround portion of a fluid containing pipe. Two fluid conduits on opposite sides, and connected adjacent opposite end portions, of the body portion lie non-radially in relation to the body portion and may be formed and connected in such a manner as to impart a turbulent swirling or helical path to fluid passing through the body portion.

8 Claims, 10 Drawing Figures

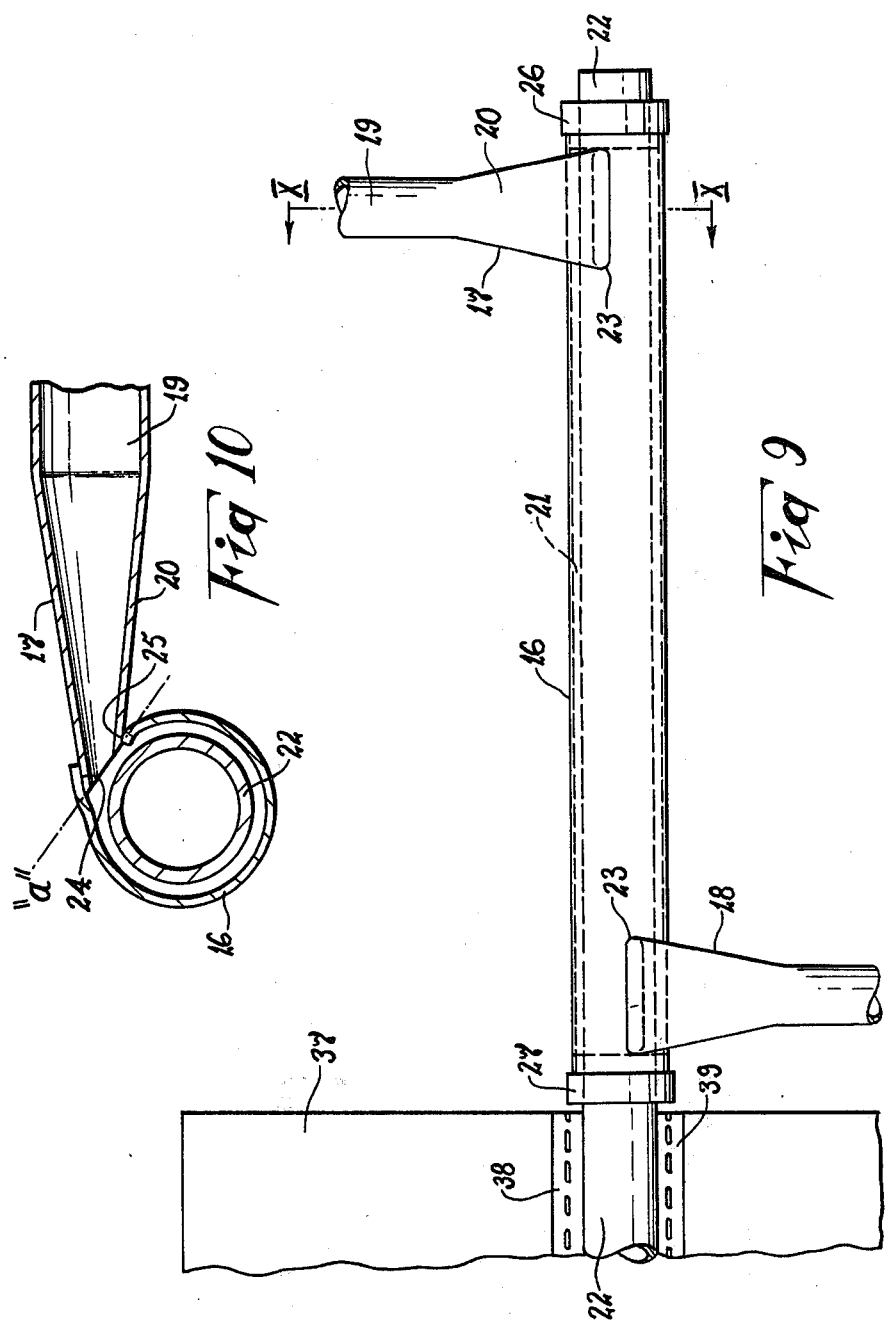

HEAT EXCHANGER FOR USE WITH HEAT PIPE

BACKGROUND OF THE INVENTION

This invention relates to heat exchangers, in particular to heat exchangers for use with heat pipes or other pipes containing fluid to, or from, which heat is to be transferred.

Heat pipes are described, for example, in Australian Patent Specification No. 455,797. As described in this specification, heat pipes are passive sealed units having a working fluid with a free-standing liquid and a substantial vapour space along substantially the entire length of the heat pipe. In use, heat is automatically transferred along the pipe in response to a difference between the respective temperatures of warmer and cooler portions of the pipe. This heat transfer takes place by a process of vaporization of the working fluid in one portion of the pipe and condensation of the working fluid in another portion of the pipe thus absorbing and giving up its latent heat of vaporisation.

In heat exchangers used with heat pipes, heat transfer is achieved by flowing a transfer fluid past portion of a heat pipe to remove heat from or transmit heat to the pipe. In previously proposed heat exchangers of this type, the flow path of the transfer fluid past the heat pipe has been fairly random. For example, a plurality of heat pipes is generally enclosed in one or more chambers through which the transfer fluid is passed. The heat transfer achieved by this type of arrangement is relatively inefficient.

It is therefore an object of this invention to provide a means whereby the heat transfer efficiency of such heat exchangers may be improved and further to provide a heat transfer device which incorporates such means.

BRIEF SUMMARY OF THE INVENTION

Accordingly, the present invention provides a heat exchanger jacket which includes a substantially tubular body portion and two fluid conduits for transfer fluid lying on opposite sides of the body portion. Each fluid conduit is connected to the body portion adjacent an opposite end portion thereof and is adapted for fluid tight connection to an opposed conduit. This opposed conduit to which the body portion conduit may be connected in use can be an entry or outlet conduit through which heat transfer fluid is lead into or removed from the heat transfer device which incorporates the jacket. Such a device may, and often will, incorporate more than one jacket and the opposed conduit for any particular body portion conduit may then be connected directly or through an appropriate junction pipe to an adjacent jacket.

The jacket of the invention is broadly characterized in that it is adapted to surround portion of a fluid-containing pipe, at least one end of the jacket being adapted for fluid tight connection to the pipe. The jacket of the invention is further characterized in that the fluid conduits are connected to lie non-radially in relation to the body portion.

This invention also provides several alternative forms of heat transfer device each of which includes at least one fluid-containing pipe with at least one portion thereof surrounded in fluid tight connection by a heat exchanger jacket having the characteristics of the present invention.

The jacket of the invention may be made in several alterative forms, some of which will be described in detail below. In each of these forms however, the fluid conduits are connected to lie non-radially in relation to the body portion of the jacket. It has been found that in one form the non-radial alignment of the fluid conduits may involve an entry or outlet in the same plane as the longitudinal axis of the body portion but so that fluid leaving or entering the conduit follows a path which is not at right angles to this axis. In other words, the fluid flow in this form is not normal to the longitudinal axis although it is in the same plane as the axis. In other forms of non-radial conduit connection, the entry or outlet is such that the fluid flow path from or to the conduit is substantially normal to the radius of the tubular body portion, or in other words, substantially tangential to the circumference of a circle in a plane transverse to the longitudinal axis of the body portion.

Whatever the non-radial alignment of the conduits, it is found that such alignment improves the heat transfer performance of the fluid flowing within the jacket and passing over the exterior surface of a fluid-containing pipe to which the jacket is connected in use. The non-radial entry makes it possible to maintain desirable turbulent flow conditions while at the same time assisting the movement of the transfer fluid from jacket entry to outlet. In addition, radial entry of the transfer fluid requires an abrupt change of flow direction when the fluid impinges on the fluid-containing pipe and this causes a loss of flow speed. Non-radial entry however makes impingement less direct, makes the change of flow direction more gradual and imports swirling on a helical flow path.

For convenience, the invention will be described in detail hereafter with reference to use of the heat exchange jacket in association with a heat pipe. It is to be appreciated, however, that the invention is broadly applicable to other types of fluid-containing pipes to, or from, which heat can be transferred by passing a heat transfer liquid through a jacket of the invention surrounding portion of the pipe.

BRIEF DESCRIPTION OF DRAWINGS

The invention will be more fully described in relation to the several illustrative and non-limitative embodiments shown in the accompanying drawings in which:

FIG. 9 is a plan view showing the use of a further alternative form of heat exchanger jacket in accordance with the invention; and FIG. 10 is a cross-section view on line X—X of FIG. 9, to an increased scale.

DETAILED DESCRIPTION OF PREFERRED EMBODIMENTS

Figure 2:
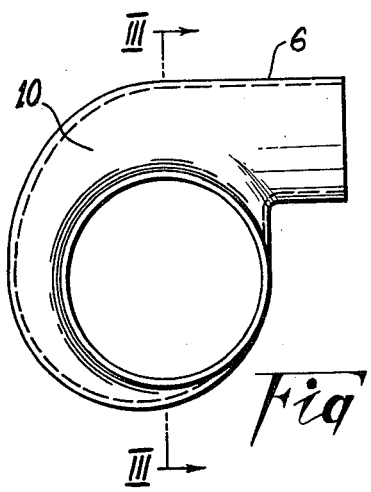
FIG. 2 is a side elevation view of the connector of FIG. 1.
Figure 1:
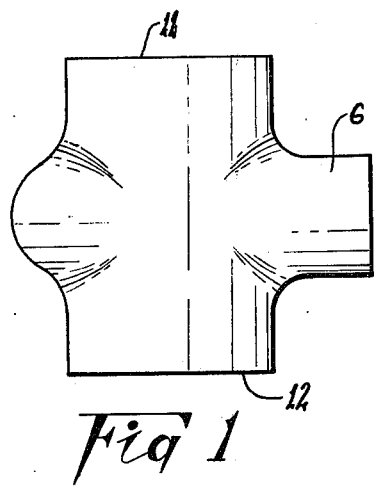
FIG. 1 is a plan view of a connector for a heat exchanger in accordance with one embodiment of the invention.
Figure 3:
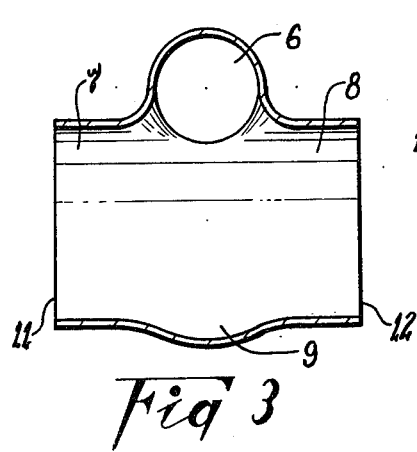
FIG. 3 is a cross-section view on line III—III of FIG. 2.

Two alternative forms of connector are illustrated in FIGS. 1 to 3 and FIGS. 4 to 6 respectively. The use of these connectors can be best understood by reference to FIG. 7 which shows the use of connectors of the type illustrated in FIGS. 4 to 6. However, the type of connector illustrated in FIGS. 1 to 3 will be used in a similar manner to the connector illustrated in FIGS. 4 to 6 as will be hereinafter described.

These two alternative types of connector are designed for use with a heat exchanger jacket which includes a tubular body portion 1 (FIG. 7) open at each end. The body portion 1 is of approximately constant internal diameter and thus provides, in use, an approximately constant annular chamber 2 between the jacket 1 and a heat pipe 3. Such a construction minimizes the amount of water in the heat exchanger which can, in use, contribute to thermal mass.

The jacket further includes an inlet connector 4 and an outlet connector 5 at opposite ends of the jacket body portion 1. The same form of connector may be used at each end of the body portion. It will be appreciated that the designation of a connector as an inlet connector or an outlet connector will depend on the flow of the heat transfer fluid and, as described hereinafter, this may vary in accordance with the construction of the heat transfer device in which the jacket of the invention is used.

Figure 7:
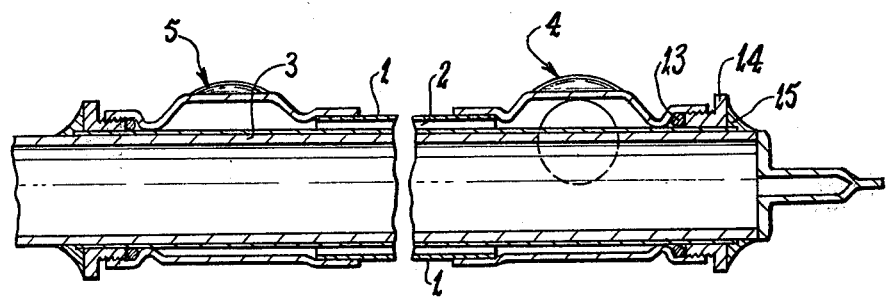
FIG. 7 is a cross-section view showing both ends of a heat exchanger jacket which incorporates connectors of the type shown in FIGS. 4 to 6, in position on the end of a heat pipe.

The connectors include a fluid conduit 6 which is adapted in use for connection to an opposed conduit. As seen in FIG. 7, the connector in use constitutes an extension of the jacket body portion in that it surrounds portion of the heat pipe. In the form of connector shown in FIGS. 1 to 3, opposite end portions of the connector are formed so as to define, with the heat pipe they surround in use, annular chambers 7 and 8. The central portion 9 of the connector is formed so as to define, with the heat pipe it surrounds in use, a flow chamber 10 of involute cross-section which, in the embodiment of FIGS. 1 to 3, merges into the annular chambers 7 and 8. The larger end of the involute cross-section flow chamber 10 merges into the fluid conduit 6.

Figure 6:
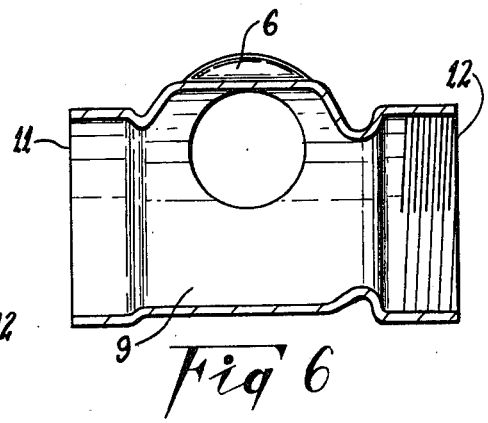
FIG. 6 is a cross-section view on line VI—VI of FIG. 5.
Figure 5:
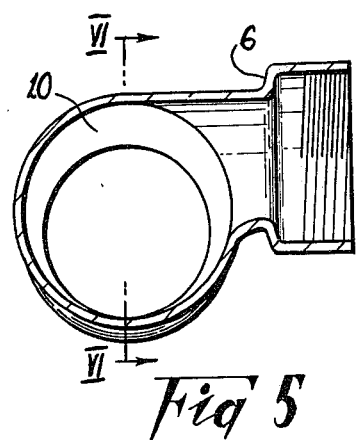
FIG. 5 is a cross-section view on line V—V of FIG. 4.
Figure 4:
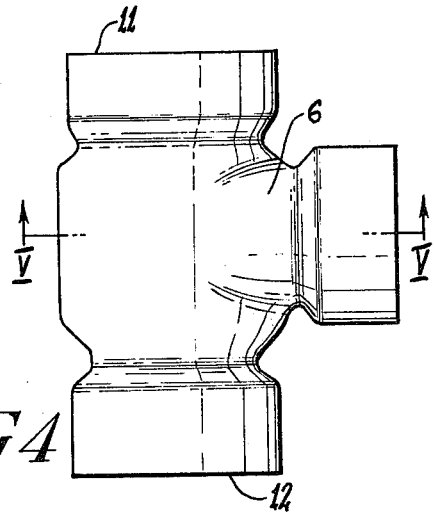
FIG. 4 is a plan view of a connector for a heat exchanger in accordance with another embodiment of the invention.

The ends 11, 12 of the connector are adapted for fluid tight connection to the body portion 1 of the jacket and to the heat pipes respectively. The end 11 is adapted for connection by soldering or brazing while the end 12 in the embodiment of FIGS. 4 to 6 is threaded to allow formation of the sealed connection using an O-ring 13, and a gland nut 14. The fluid tight connection at the end 12 may be further sealed by the use of a silicone rubber seal 15.

An alternative form of the invention is illustrated in FIGS. 9 and 10. In this form of the invention, the body portion 16 of the jacket is connected adjacent its opposite ends to conduits 17 and 18. Assuming for the sake of this discussion that the conduit 17 is an inlet conduit, it will be seen that the inlet conduit merges from a substantially cylindrical tube 19 into an inlet nozzle 20 which is of flared wedge formation. The effect of this nozzle formation is to accelerate the flow rate of the transfer fluid as it passes through the nozzle into the annular chamber 21 between the inner surface of the jacket body portion and the outer surface of the heat pipe 22.

It will be seen that the fluid conduits are connected to the body portion of the jacket at an orifice 23 of complementary shape to the end of the nozzle in the conduit. The orifice 23 may be formed by punching an appropriate slot in the body portion and preferably working the periphery of the orifice to provide protruding support surfaces as at 24 and 25 within which the free end portion of the nozzle can be inserted and to which the end of the nozzle is sealed in fluid tight engagement. The formation of such support surfaces minimizes the interruption to the flow path of the transfer fluid as it passes from the inlet conduit into the annular chamber between the body portion and the heat pipe.

The flared wedge form of inlet nozzle is preferably formed by first expanding the free end of the tubular conduit and then forming the expanded portion to a uniformly tapered nozzle having an orifice at the free end in the form of an elongated slot. The free end of the nozzle is preferably trimmed off at an angle as indicated at "a" in FIG. 10 so that the area of the orifice thereby formed is of decreased cross-sectional flow area when compared with the flow area in the tubular portion of the conduit. Preferably, the nozzle orifice has a cross-sectional flow area not more than the transverse cross-sectional area of the annular chamber formed between the body portion and the heat pipe.

As will be apparent from a consideration of FIG. 10, the transfer fluid entering through conduit 17 has a flow path which is substantially tangential to the circumference of the heat pipe 22. The acceleration of the transfer fluid caused by the form of nozzle 20 increases the speed and hence the turbulence of the flowing transfer fluid. Heat transfer in turbulent flow conditions is superior to that occurring in laminar flow conditions. Acceleration of the transfer fluid in the nozzle enables the use of lower flow speeds, and hence lower head loss, in the pipes connecting the heat exchanger jackets. The orifice from conduit 17 enters the jacket adjacent sealing means 26 and the transfer fluid is therefore forced to flow around the annular chamber between the body portion and the heat pipe with a swirling or helical motion before leaving via outlet conduit 18. The orifice for outlet conduit 18 is similarly located adjacent sealing means 27 which, with sealing means 26 at the other end of the jacket, seal the jacket in fluid tight connection to the heat pipe 22.

Figure 8:
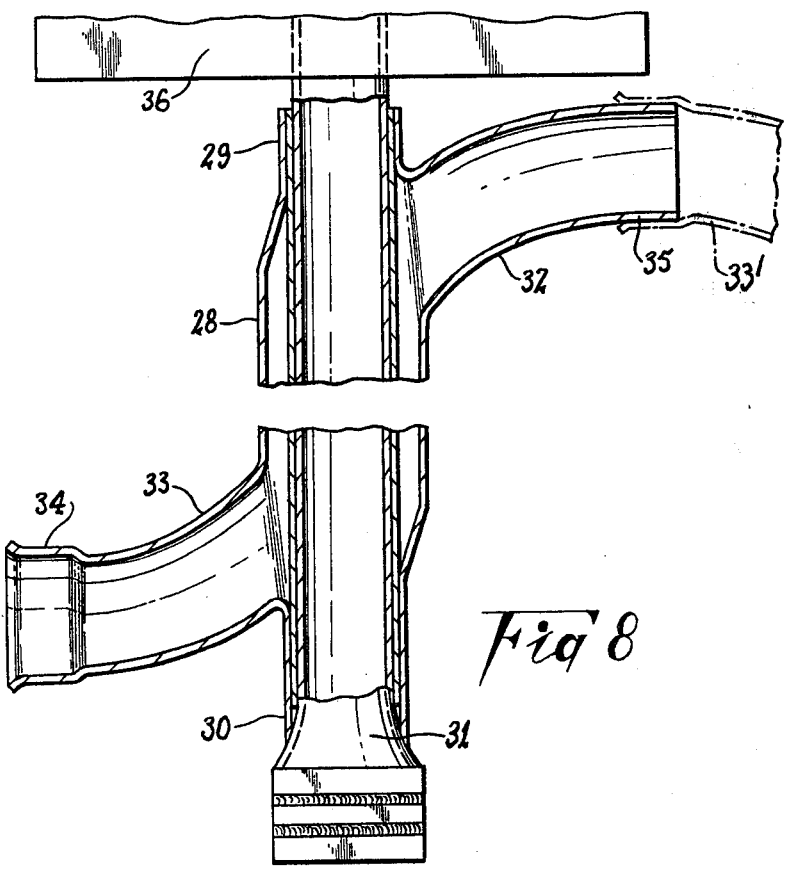
FIG. 8 is a part plan, part cross-section view showing the use of an alternative form of heat exchanger jacket in accordance with the invention.

FIG. 8 of the drawings illustrates a further alternative form of heat exchanger jacket construction made in accordance with the present invention. In this embodiment, the jacket 28 is formed so that the ends 29, 30 of the jacket form a close sliding fit for the heat pipe 31 with which the jacket is associated in use. Thus, the ends 29, 30 are relatively constricted in diameter compared with the remainder of the body portion so that the remainder of the body portion provides in association with the heat pipe, an annular chamber through which transfer fluid moving through conduits 32 and 33 may flow around the heat pipe. The path of transfer fluid entering, for example, through conduit 33, is non-radial and directs the fluid towards the other end of the jacket from the end at which it enters.

The jacket illustrated in FIG. 8 is adapted for sealed connection to an opposed conduit. The opposed conduits may be brought into abutment and connected by the use of an appropriate sleeve member. Preferably, however, one conduit on each jacket is of female formation as at 34 while the other conduit is of male formation as at 35. In this way, the conduits are adapted to cooperate in forming a sealed connection with the opposite conduit of an adjacent jacket turned longitudinally through 180°.

If desired, the jacket 28 of FIG. 8 may be formed internally with appropriate flow directors. Thus, provision may be made to increase the turbulence of flow of the transfer fluid through the jacket and/or to direct the flow more positively in a swirling or helical path. Such flow directors are not shown in FIG. 8 but may be formed by appropriate inserts within the jacket or by forming dimples from the exterior of the jacket which protrude into the jacket interior.

Various forms of non-radial connection of the fluid conduits to the body portion have been illustrated herein. Thus, the connection of FIGS. 1 to 3, 4 to 6 and 9 to 10 is non-radial but also generally tangential to the longitudinal axis of the tubular body portion; the connection of FIGS. 7 and 8 is also non-radial but is also not normal to the longitudinal axis of the body portion. Other non-radial connections may be envisaged which give the advantages of this form of connection: for example, conduits may be connected at each extreme end of the body portion so that the fluid flow direction through the junction between the conduit and the body portion is both generally tangential and non-normal to the longitudinal axis of the body portion.

The conduits at opposite end portions of the respective jackets illustrated in the accompanying drawings are all substantially coplanar. This alignment is essential for the jacket illustrated in FIGS. 7 and 8 and does not present any problem with the jackets of FIGS. 1 to 3 and 4 to 6 as the conduits of adjacent jackets are aligned simply by turning the jacket longitudinally through 180°. However, in the embodiment illustrated in FIGS. 9 and 10, simple alignment of the conduits in adjacent jackets by this means is not possible. This alignment problem can be overcome without the need to fabricate and use alternately mirror-image or opposite-handed jackets by extending the respective conduits tangentially at the opposite end portions of each jacket from the same side of the jacket at an angle to align with the conduit of an adjacent, 180° turned jacket.

All of the illustrated heat exchanger jackets are shown with both ends open so that a heat pipe can be passed into and through the jacket from either end. However, if desired, the jacket may be formed, at least initially, with one or both ends closed and the or each closed end removed for insertion of the heat pipe. It is preferred to pass the end portion of the heat pipe right through the jacket to which the end portion is to be connected, as this avoids back pressure between the end of the heat pipe and a sealed end of the jacket tending to force the pipe and jacket apart.

The jackets of the present invention may be used in various forms of heat transfer device. The relative positions of the jacket or jackets and heat pipe or heat pipes used in a particular transfer device will depend on the nature of the device and the purpose for which it is to be used. However, the jackets of the invention have been developed particularly for use in conjunction with a solar heat collector to be used in water heating apparatus. In this application, each heat pipe is preferably connected to two laterally extending fins located on opposite sides of the heat pipe and running the length of the heat pipe, apart from the end portion or portions of the heat pipe which are to be mounted in a heat exchanger jacket. The fins may be connected by any method providing efficient heat conduction between the fins and the pipe. Thus, the fins may be welded or rivetted to the pipe. The fins may alternatively be extruded integrally with the heat pipe in which case part of the fins will be removed at the portion of the heat pipe to which the heat exchanger jacket is to be connected. Preferably, however, the heat pipe is extruded with a pair of top and bottom jaws, each pair extending laterally on an opposite side of the pipe. These jaws are adapted to contain the edge of an associated fin and may be connected to the associated fin, for example, by passage through appropriate rollers to force the jaws together with the edge of the fin between them. The techniques used to connect the heat pipe and the associated fins may be of the kind disclosed for the formation of compression seam joints and stitch seam joints in U.S. Pat. Nos. 3,722,052 and 3,789,563, both granted to Andrew J. Toti.

The use of preformed fins which are connected through jaws extruded integrally with the heat pipe is preferred. Thus, preformed fins of the order of 0.5 to 1.8 mm in thickness allow a reduction in material over that required for a one-piece finned heat pipe extrusion and in the thermal mass of the heat exchanger device. The fins may be formed with a stepped edge complimentary to the jaws on the heat pipe to assist in joining these components. The free edge of the fin opposite the heat pipe may be rippled for stiffening purposes.

The location of an integrally formed fin structure 36 is indicated in FIG. 8. In this illustration, the integrally formed fin structure extends continuously in a plane which forms a tangent to the circumference of the heat pipe. This formation provides an attractive finish for an assembly of adjacent heat transfer devices making up a solar heat collector.

The fin structure 37 illustrated in FIG. 9 shows the fin joined by a stitch seam technique to jaws 38 and 39 extruded with the heat pipe, on opposite sides thereof.

In the use of the present invention for a solar heat collector, it will normally be preferable to assemble a plurality of adjacent heat pipes and associated jackets in order to provide an adequate area for collection of the incident solar radiation. Such an assembly will preferably include a plurality of heat pipes mounted with their longitudinal axes parallel and their end portions in alignment. One end portion of each heat pipe will be fitted with a heat exchanger jacket and adjacent heat exchanger jackets will be appropriately connected to allow the through-flow of heat transfer fluid.

Alternatively, a heat transfer device in accordance with the invention may consist of an assembly of at least one group of two heat pipes mounted with their longitudinal axes in alignment and with their opposite ends adjacent and in fluid tight connection to a single heat exchanger jacket. Thus, in this form of heat transfer device, one could use a single jacket to transfer heat to or from separate heat pipes on each side of the jacket.

A further alternative heat transfer device assembly in accordance with the invention comprises at least one heat pipe mounted with each end thereof in fluid tight connection to a separate heat exchanger jacket. It will be appreciated that with both this assembly and the assembly described in the preceding paragraph, a plurality of heat pipes and associated jackets can be assembled with the jackets appropriately connected for through-flow.

Although the foregoing specific description has, as explained, described the invention in relation to its use with heat pipes, it will be appreciated that alternative forms of heat exchanger device to those described in the immediately preceding paragraphs can be constructed using other types of fluid-containing pipes. With other such pipes, the forms of device constructed will normally involve use of a jacket or jackets other than at an end portion of the fluid-carrying pipe.

As indicated above, the various forms of heat transfer device which can be assembled using the heat pipe and jacket arrangement of the present invention will preferably include a plurality of heat pipes and associated jackets with the jackets appropriately connected for through-flow of the heat transfer liquid. Adjacent jackets may be connected so that the heat transfer liquid will flow through the jackets either in series or in parallel. The method of connection used will depend upon the results which are to be achieved with the particular heat transfer device.

Where the heat transfer device is assembled to allow series flow of the heat transfer fluid, the fluid flows successively from one jacket to the next and so on picking up an increment of heat in each jacket. This results in the outlet of the heat transfer device, such as a solar collector, using jackets connected in this way, operating at a significantly higher temperature than the inlet side, and this causes higher heat losses on this side of the device. In a wide multiple heat pipe solar collector, this temperature gradient could differentially stress the glass cover of the collector resulting in glass breakage. In addition, series flow connection involves the full inlet flow volume passing through each heat exchanger jacket so that the total flow volume is limited to the maximum flow rate allowable in the heat transfer device which will not result in impingement corrosion of its inner surfaces.

With the parallel flow method of assembly, however, the flow volume is divided between each heat exchanger jacket by inlet and outlet manifolds, and the flow volume and rate in each is therefore considerably lower than for the series case. If the maximum flow rate limitation imposed by the need to avoid impingement corrosion is achieved in each heat exchanger jacket, obviously a much greater flow rate can be achieved in the inlet and outlet of the respective manifolds. Moreover, this arrangement will result in only one increment of temperature increase occurring in the whole collector, and as the overall temperature is less than in the series case, heat loss to the surrounding environment is less. There is also no, or very little, temperature gradient induced in any glass cover.

Another benefit of the parallel flow connection is that if the flow rate in each heat exchanger jacket is reduced below the maximum flow rate, but the flow rate is still maintained in the necessary range to achieve turbulent flow within the annular chamber, then a smaller heat loss is achieved in the passage through the connected heat exchanger jackets. Nevertheless, this smaller head loss is achieved while still allowing a greater total flow volume than the series case and more efficient heat transfer at a lower temperature. A reduction in head loss is a significant achievement for large installations involving hundreds of collectors, as smaller pumps can be used than would be required for the series method of assembly.

The materials of construction used to produce the jacket and heat pipes will depend on the application for which the components are designed. If the jacket is to be used in a domestic or other hot water system, it will preferably be formed from copper tube of appropriate diameter. However, if the jacket is to be used, for example, in a swimming pool heater system, it may be moulded or otherwise formed from an appropriate plastics material.

In a solar heat collector application, the heat pipes themselves and any associated fins are preferably formed from aluminium. In order to minimize corrosion problems experienced in the use of aluminium in flowing water systems, it is preferred to clad the end of the heat pipe to which the jacket will be connected in use with a copper or other protective sleeve of heat conductive material. The use of a copper sleeve also assists in sealing the jacket to the heat pipe. The preferred copper sleeve may be fitted onto the heat pipe by shrink-fitting, swaging or drawing. A tight fit between the sleeve and the pipe may thereby be provided to enable efficient heat conduction between the heat pipe and the protective sleeve. If a non-aqueous heat transfer fluid is to be used, which is non-corrosive to aluminium, no copper sleeve is necessary on the heat pipe and the heat exchanger jacket can be constructed also from aluminium. The use of an all aluminium heat transfer device and a non-aqueous heat transfer fluid boiling above 100° C. allows temperatures greater than 100° C. to be transferred through the device.

Having now described our invention, what we claim as new and desire to secure by Letters Patent is:

1. A heat exchanger jacket adapted to surround portion of a fluid-containing pipe and having at least one end adapted for fluid tight connection to said pipe, said jacket including a substantially tubular body portion and two fluid conduits lying on opposite sides of the body portion, each said conduit being connected to the body portion adjacent an opposite end portion thereof and adapted for fluid tight connection to an opposed conduit in such a manner as to impart a turbulent swirling or helical path to fluid passing through said body portion, characterized in that the end of at least said fluid conduit adapted to carry incoming fluid is formed before connection of the conduit to said body portion as a nozzle of decreased cross-sectional flow area normal to the flow of said fluid, and said decreased cross-sectional flow area is not more than the cross-sectional area of the fluid flow passage in the annular chamber, formed in use between said body portion and said pipe, adjacent the nozzle and normal to the flow path in said chamber.

2. A heat exchanger jacket as claimed in claim 1 characterized in that said nozzle is of flared wedge form.

3. A heat exchanger jacket as claimed in claim 1 characterized in that said nozzle is of flared wedge form and is sealed in fluid tight manner in an orifice in said body portion, said orifice having been formed so as to provide protruding support surfaces within and adjacent to which the free end portion of said nozzle is adapted to lie so that the fluid flow path between the nozzle and the flow passage is substantially unobstructed.

4. A heat exchanger jacket as claimed in claim 1 characterized in that said body portion, between the connection of said conduits at its respective end portions, is of substantially constant transverse cross-section and such diameter relative to said fluid containing pipe that said annular chamber optimizes the amount of heat transfer fluid in the heat exchanger.

5. A heat transfer device including at least one fluid-containing heat pipe mounted with one end portion thereof in a heat exchanger jacket through which a fluid may be passed to transfer heat between said fluid and a working fluid in the heat pipe, said jacket including a substantially tubular body portion and two fluid conduits lying on opposite sides of the body portion, each said conduit being connected to the body portion adjacent an opposite end portion thereof and adapted for fluid tight connection to an opposed conduit in such a manner as to impart a turbulent swirling or helical path to fluid passing through said body portion, characterized in that the end of at least said fluid conduit adapted to carry incoming fluid is formed before connection of the conduit to said body portion as a nozzle of decreased cross-sectional flow area normal to the flow of said fluid, said decreased cross-sectional flow area is not more than the cross-sectional area of the fluid flow passage in the annular chamber, formed in use between said body portion and said pipe, adjacent the nozzle and normal to the flow path in said chamber, and said at least one heat pipe being mounted in fluid tight connection to said heat exchanger jacket.

6. A heat transfer device including at least one fluid-containing heat pipe mounted with one end portion thereof in a heat exchanger jacket through which a fluid may be passed to transfer heat between said fluid and a working fluid in the heat pipe, said jacket including a substantially tubular body portion and two fluid conduits lying on opposite sides of the body portion, each said conduit being connected to the body portion adjacent an opposite end portion thereof and adapted for fluid tight connection to an opposed conduit in such a manner as to impart a turbulent swirling or helical path to fluid passing through said body portion, characterized in that the end of at least said fluid conduit adapted to carry incoming fluid is formed before connection of the conduit to said body portion as a nozzle of decreased cross-sectional flow area normal to the flow of said fluid, said decreased cross-sectional flow area is not more than the cross-sectional area of the fluid flow passage in the annular chamber, formed in use between said body portion and said pipe, adjacent the nozzle and normal to the flow path in said chamber, and said at least one heat pipe being mounted at each end in fluid tight connection to said heat exchanger jacket.

7. A heat transfer device including at least two fluid-containing heat pipes each with one end thereof mounted in a heat exchanger jacket through which a fluid may be passed to transfer heat between said fluid and a working fluid in the heat pipe, said jacket including a substantially tubular body portion and two fluid conduits lying on opposite sides of the body portion, each said conduit being connected to the body portion adjacent an opposite end portion thereof and adapted for fluid tight connection to an opposed conduit in such a manner as to impart a turbulent swirling or helical path to fluid passing through said body portion, characterized in that the end of at least said fluid conduit adapted to carry incoming fluid is formed before connection of the conduit to said body portion as a nozzle of decreased cross-sectional flow area normal to the flow of said fluid, said decreased cross-sectional flow area is not more than the cross-sectional area of the fluid flow passage in the annular chamber, formed in use between said body portion and said pipes, adjacent the nozzle and normal to the flow path in said chamber, and said two heat pipes being mounted with their longitudinal axes in alignment and with their opposite ends adjacent and in fluid tight connection to said heat exchanger jacket.

8. A heat transfer device including at least one fluid-containing heat pipe mounted with one end portion thereof in a heat exchanger jacket through which a fluid may be passed to transfer heat between said fluid and a working fluid in the heat pipe, said jacket including a substantially tubular body portion and two fluid conduits lying on opposite sides of the body portion, each said conduit being connected to the body portion adjacent an opposite end portion thereof and adapted for fluid tight connection to an opposed conduit in such a manner as to impart a turbulent swirling or helical path to fluid passing through said body portion, characterized in that the end of at least the said fluid conduit adapted to carry incoming fluid is formed before connection of the conduit to said body portion as a nozzle of decreased cross-sectional flow area normal to the flow of said fluid, said decreased cross-sectional flow area is not more than the cross-sectional area of the fluid flow passage in the annular chamber, formed in use between said body portion and said pipe, adjacent the nozzle and normal to the flow path in said chamber, two laterally extending fins being located on opposite sides of said at least one heat pipe running the length of the heat pipe apart from the end portion mounted in the heat exchanger jacket, said fins being attached to the heat pipe by means for providing efficient heat conduction between the fins and the heat pipe, and said heat pipe being mounted in fluid tight connection to said heat exchanger jacket.

* * * * *